United States Patent
Shibayama

(10) Patent No.: US 7,515,826 B2
(45) Date of Patent: Apr. 7, 2009

(54) IMAGE PICKUP APPARATUS AND ELECTRONIC APPARATUS

(75) Inventor: Yoshinobu Shibayama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 389 days.

(21) Appl. No.: 11/416,040

(22) Filed: May 2, 2006

(65) Prior Publication Data

US 2006/0269272 A1 Nov. 30, 2006

(30) Foreign Application Priority Data

May 27, 2005 (JP) ............................. 2005-156243

(51) Int. Cl.
*G03B 17/18* (2006.01)
(52) U.S. Cl. .................. 396/287; 396/277; 396/539; 348/333.06; 348/374
(58) Field of Classification Search ............... 396/287, 396/539, 277, 278, 279, 535, 296; 348/333.06, 348/372, 374, 375, 376, 14.02, 14.07, 333.07; 361/681; D16/200, 211, 212, 217, 218, 219
See application file for complete search history.

(56) References Cited

U.S. PATENT DOCUMENTS

| | | | | |
|---|---|---|---|---|
| 5,654,111 A | * | 8/1997 | Minomiya et al. | .......... 429/162 |
| 5,739,859 A | * | 4/1998 | Hattori et al. | ............... 348/375 |
| 6,115,069 A | | 9/2000 | Kuroki et al. | |
| 6,937,280 B2 | * | 8/2005 | Kawai et al. | ........... 348/333.06 |
| 2005/0200739 A1 | * | 9/2005 | Ahn | ...................... 348/333.06 |

FOREIGN PATENT DOCUMENTS

CN 1175159A A 3/1998

OTHER PUBLICATIONS

The above-identified foreign patent document was cited in an Aug. 29, 2008 Chinese Office Action issued in Chinese Patent Application 200610087849.2. A translation of the Office Action is enclosed.

\* cited by examiner

*Primary Examiner*—W. B. Perkey
*Assistant Examiner*—David M. Schindler
(74) *Attorney, Agent, or Firm*—Cowan, Liebowitz & Latman, P.C.

(57) ABSTRACT

An image pickup apparatus has a display unit which is movably coupled with an apparatus main body 1 through coupling portion 5. The display unit has fastening members 21 and 22 for fixing exterior members 3 and 4 of a casing 2 of the display unit. The apparatus main body 1 has a concave portion 8 into which predetermined portions of the exterior members 3 and 4 can be loosely inserted. A movable range of the display unit is widened by the concave portion 8, thereby enabling the fastening members 21 and 22 to be operated. Thus, the image pickup apparatus and an electronic apparatus in which handling performance including a disassembling work and the like of the display unit can be improved are provided.

3 Claims, 6 Drawing Sheets

IMAGE PICKUP APPARATUS AND ELECTRONIC APPARATUS

BACKGROUND OF THE INVENTION

1. Field of the Invention

The invention relates to an image pickup apparatus and an electronic apparatus each having a display panel casing which is attached to the apparatus or an apparatus main body through hinge portion so as to be openable/closable and rotatable.

2. Related Background Art

Hitherto, in an image pickup apparatus for photographing a motion image and a still image, a display panel casing 2 for displaying the image or the like has been coupled with a main body casing 1 through an openable/closable and rotatable hinge member 5 as disclosed in Japanese Patent Application Laid-Open No. 2004-236104 or shown in FIGS. 9 to 11. The display panel casing 2 has a configuration in which a display panel 17, a backlight unit 18, and a display backlight driving circuit board 19 are sandwiched between a front cover 3 and a rear cover 4. As means for fixing the front cover 3 and the rear cover 4, generally, there is used a construction in which on the front edge side of the display panel casing 2, claws 14 and 15 of the rear cover 4 are hooked to concave portions (not shown) of the front cover 3 and, on a root side of the display panel casing 2, they are fixed with screws 21 and 22, thereby coupling them.

However, according to the conventional configuration, as shown in FIGS. 9 and 10, it is difficult to operate the screws 21 and 22 fixed on the root side of the display panel casing 2 by using a screwdriver 20 at any position where the display panel casing 2 becomes openable/closable and rotatable. That is, the main body casing 1 becomes an obstacle along the direction in which the surfaces of the screws 21 and 22 are directly seen (axis direction of the screw), and a bit front edge of the screwdriver 20 to attach and remove the screws 21 and 22 cannot be come into engagement with engaging grooves on the surfaces of the screws 21 and 22. In this state, the display panel casing 2 cannot be disassembled.

Therefore, hitherto, after the image pickup apparatus was once completed, in the case of inspecting or repairing the display backlight driving circuit board in the display panel casing 2 with respect to inferior products upon producing which have been found out in an inspecting step at a factory or repair products which are requested by the users of the image pickup apparatuses, an exterior cover of the main body casing 1 has to be disassembled to inspect or repair the board. In this case, the display panel casing 2 is separated from the exterior cover of the main body casing 1 together with the hinge member 5 (state shown in FIG. 11), the screws 21 and 22 for coupling the front cover 3 and the rear cover 4 are removed, thereby disassembling the display panel casing 2. Consequently, the number of working steps increases, costs of the products are increased due to an increase in the number of steps upon producing, and repair costs are increased due to an increase in repair time upon repairing.

SUMMARY OF THE INVENTION

It is an object of the invention to provide an image pickup apparatus and an electronic apparatus in which, particularly, handling performance including a disassembling work and the like of a display unit can be improved.

To accomplish the above object, according to the invention, there is provided an image pickup apparatus having a display unit which is movably coupled with an apparatus main body through coupling portion, wherein the display unit has a fastening member for fixing an exterior member of the display unit, the apparatus main body has a concave portion into which a predetermined portion of the exterior member can be loosely inserted, and a movable range of the display unit is widened by the concave portion, thereby enabling the fastening member to be operated.

In the image pickup apparatus of the invention, the coupling portion is constructed by a hinge for coupling the display unit so as to be openable/closable and rotatable and the fastening member is arranged on the hinge side.

In the image pickup apparatus of the invention, the concave portion is constructed as an enclosing portion of a predetermined functional member which is arranged in the apparatus main body and the concave portion is closed when the apparatus is normally used.

In the image pickup apparatus of the invention, a backup battery for specific data which is displayed in the display unit is included as a functional member and the concave portion is covered by a detachable lid member.

In the image pickup apparatus of the invention, a connector which is connected to a circuit board in the apparatus main body is included as a functional member and the concave portion is covered by a lid member which is detachable only at specific timing.

In the image pickup apparatus of the invention, a battery for driving the apparatus is included as a functional member and the concave portion is occupied by the driving battery in a normal state.

According to the invention, there is provided an electronic apparatus having a display unit which is movably coupled with an apparatus main body through coupling portion, wherein the display unit has a fastening member for fixing an exterior member of the display unit, the apparatus main body has a concave portion into which a predetermined portion of the exterior member can be loosely inserted, and a movable range of the display unit is widened by the concave portion, thereby enabling the fastening member to be operated.

According to the invention, when the display unit is enclosed into the apparatus main body, the concave portion is provided for the apparatus main body which faces the display surface of the display unit and a part of the display unit casing is dropped into the concave portion at the predetermined position where the display unit has been opened/closed and rotated. Thus, the fastening member for fixing provided for the side surface of a rotary axis side of the display unit is attached/removed, thereby enabling the exterior member of the display unit to be disassembled even in the product completion state. Therefore, in the production inferior products which have been found out in the inspecting step at the factory or the repair products which are requested by the users of the image pickup apparatuses, the display unit can be extremely easily disassembled. Thus, repair workability can be fairly improved, the production man-hour is decreased, and the production costs can be reduced. Further, since the repairing time can be shortened, the repair costs of the product can be also reduced.

When the image pickup apparatus is used, by closing the concave portion of the apparatus main body by using the lid, even if the display unit is opened/closed and rotated, a part of the display unit casing is not dropped into the concave portion. Therefore, since the display unit is not hooked to the concave portion of the apparatus main body, the smooth operation is guaranteed and the good operating feeling is realized.

The above and other objects, features, and advantages of the invention will become more apparent from the following detailed description taken in conjunction with the accompanying drawings.

DETAILED DESCRIPTION OF THE PREFERRED EMBODIMENTS

Preferred embodiments of an image pickup apparatus according to the invention will be described hereinbelow with reference to the drawings.

First Embodiment

Figure 1:
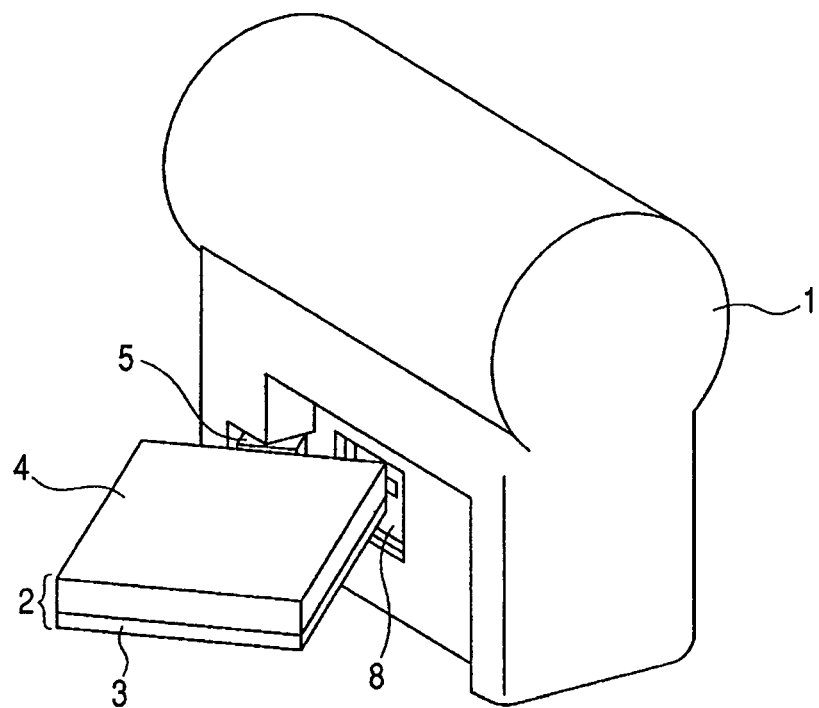
FIG. 1 is a perspective view showing the state where a display panel casing in the first embodiment of the invention has been dropped into a backup battery chamber of a main body casing.
Figure 2:
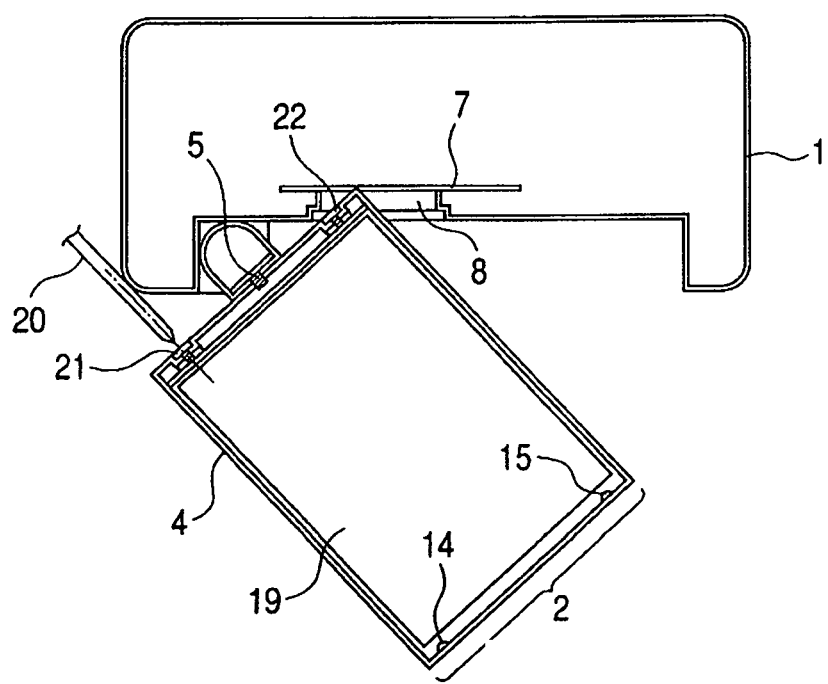
FIG. 2 is a cross sectional view showing the state where the display panel casing in the first embodiment of the invention has been dropped into the backup battery chamber of the main body casing.
Figure 3:
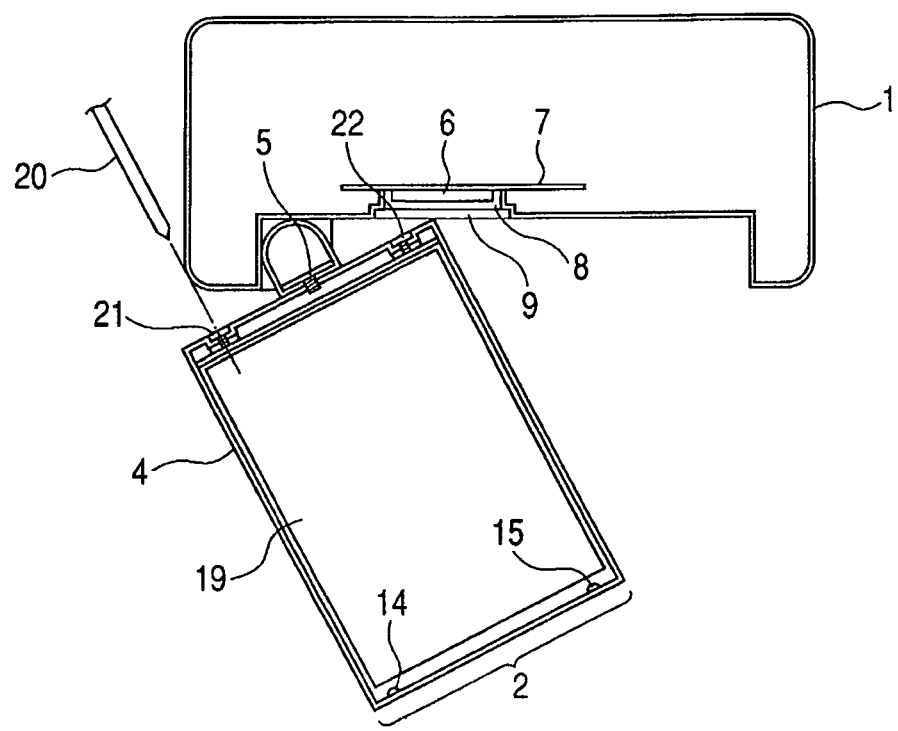
FIG. 3 is a cross sectional view showing the state where a backup battery has been inserted into the backup battery chamber of the main body casing and a lid has been attached when an image pickup apparatus in the first embodiment of the invention is used.
Figure 4:
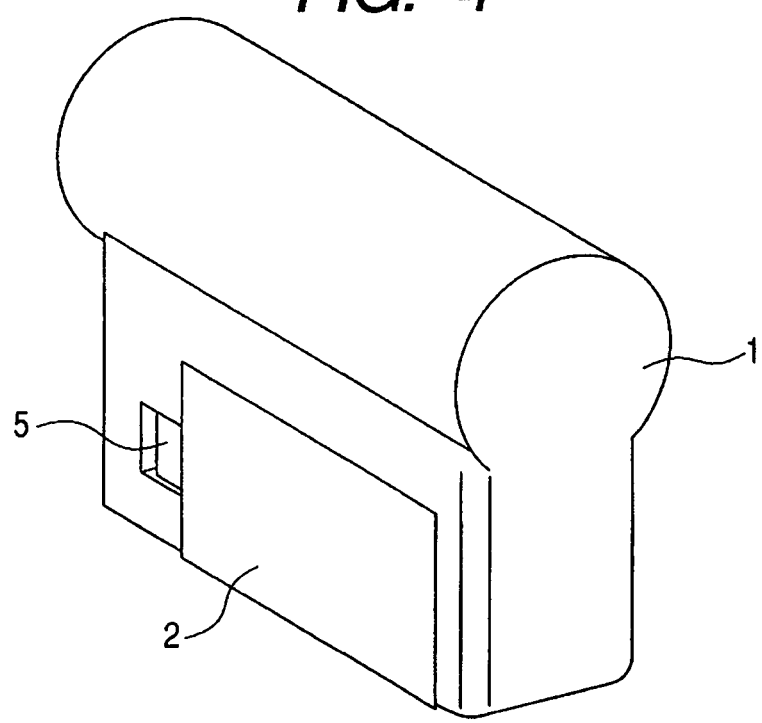
FIG. 4 is a perspective view showing the state where the display panel casing has been enclosed into the main body casing in the image pickup apparatus in the first embodiment of the invention.

FIGS. 1 to 4 are diagrams showing the first embodiment of the invention. FIG. 1 is a perspective view showing the state where the display panel casing 2 has been dropped into a backup battery chamber of the main body casing 1 in the image pickup apparatus according to the invention. FIG. 2 is a cross sectional view showing the state of FIG. 1. FIG. 3 is a cross sectional view showing the state where the backup battery has been inserted into the backup battery chamber of the main body casing 1 and a lid has been attached when the image pickup apparatus is used. FIG. 4 is a perspective view showing the state where the display panel casing 2 has been enclosed into the main body casing 1 in the image pickup apparatus according to the invention.

In the diagram, reference numeral 1 denotes the main body casing of the image pickup apparatus; and 2 indicates the display panel casing whose exterior is constructed by the front cover 3 and the rear cover 4. The display panel (not shown), the backlight unit (not shown), and the display backlight driving circuit board 19 are arranged in the casing formed by the front cover 3 and the rear cover 4. In the case of fixing the front and rear covers 3 and 4, they are coupled by hooking the claws 14 and 15 of the rear cover 4 on the front edge side of the display panel casing 2 to concave portions (not shown) of the front cover 3 and by fixing the root side of the display panel casing 2 by the screws 21 and 22.

Reference numeral 5 denotes the hinge member for coupling the main body casing 1 with the display panel casing 2 and enabling the display panel casing 2 to be rotated in the opening/closing direction and the rotating direction with respect to the main body casing 1. Reference numeral 6 denotes a backup battery for backing up data such as time setting and the like; 7 a battery board for electrically connecting the backup battery 6; 8 a concave portion formed in the main body casing 1 adapted to enclose the backup battery 6; and 9 a lid for closing an opening of the concave portion 8. The user can attach and remove the lid 9 to/from the main body casing 1 so that the backup battery 6 can be exchanged.

In the above construction, procedures in the case where after the image pickup apparatus was completed at a factory, a state of the display backlight driving circuit board 19 in the display panel casing 2 is checked at the final inspecting step will now be described.

For example, from the state where the display panel casing 2 has been enclosed into the main body casing 1 as shown in FIG. 4, the display panel casing 2 is rotated in the opening direction from the main body casing 1. When the surface of the main body casing 1 hidden by the display panel casing 2 appears, the lid 9 on the surface of the main body casing 1 is removed. Although details of an attaching method of the lid 9 are not shown in the embodiment, for example, a method whereby a claw and an elastic member are used and mutually hooked, thereby fixing the lid, or a method whereby the lid is fixed with a screw, or the like may be used.

In the state where the lid 9 is removed and the concave portion 8 appears, the backup battery 6 is removed. The display panel casing 2 is opened by about 90° and, subsequently, rotated in the rotating direction by about 90°. In this state, when the display panel casing 2 is rotated in the closing direction toward the main body casing 1, a corner portion of the root side of the display panel casing 2 is dropped into the concave portion 8 of the main body casing 1. This state is shown in FIGS. 1 and 2.

A bit front edge of the screwdriver 20 is come into engagement with the engaging groove of the screw 21 from the front as shown in FIG. 2 and the screw 21 is removed. After that, the display panel casing 2 is temporarily rotated in the opening direction, thereby obtaining the state where the corner portion of the root side of the display panel casing 2 has been pulled out of the concave portion 8. In this state, the display panel casing 2 is reversely rotated by 180° and again rotated in the closing direction toward the main body casing 1. Thus, since a corner portion of the root side on the opposite side of the display panel casing 2 is dropped into the concave portion 8 of the main body casing 1, the other screw 22 on the root side of the display panel casing 2 can be removed.

By removing the two screws 21 and 22 as mentioned above, the front cover 3 of the display panel casing 2 can be opened from the rear cover 4 from the root side. Thus, the hooking between the concave portion of the front cover 3 and the claws 14 and 15 of the rear cover 4 provided for the front edge side of the display panel casing 2 is released and the rear cover 4 is removed. In this state, the state of the display backlight driving circuit board 19 can be directly checked. Ordinarily, since the lid 9 of the backup battery 6 has been attached in the using state of the user, even if the procedures as mentioned above are executed, the display panel casing 2 is not dropped into the concave portion 8.

When the display panel casing 2 is enclosed into the main body casing 1 as mentioned above, the concave portion 8 is formed on the surface of the main body casing 1 side which faces the display surface and a part of the display panel casing 2 is dropped into the concave portion 8 at a predetermined position where the display panel casing 2 has been opened/closed and rotated. Thus, since the bit front edge of the screwdriver 20 can be come into engagement with the engaging grooves of the screws 21 and 22 provided for the side surface of the rotary axis side of the display panel casing 2 without being interfered, the screws 21 and 22 for fixing the display panel casing 2 can be attached and removed.

Since the concave portion 8 of the surface of the main body casing 1 has been closed by the lid 9 when the image pickup apparatus is normally used, a part of the display panel casing 2 is not dropped into the concave portion 8 at any position where the display panel casing 2 has been opened/closed and rotated. Therefore, when the apparatus is used, the screws 21 and 22 for fixing the display panel casing 2 cannot be attached and removed because the main body casing 1 itself becomes an obstacle and the bit front edge of the screwdriver 20 cannot be come into engagement with the engaging grooves of the heads of the screws 21 and 22.

Second Embodiment

Figure 5:
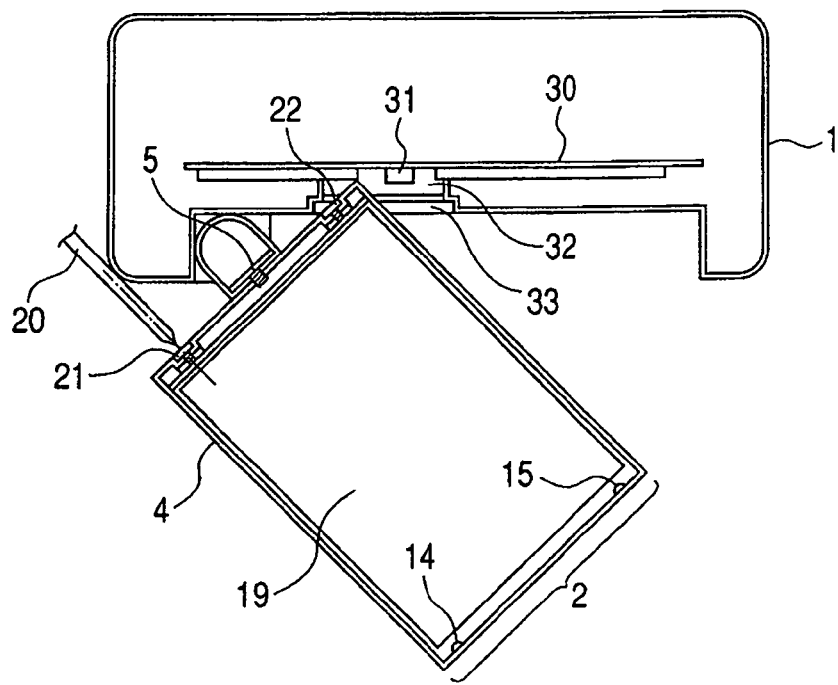
FIG. 5 is a cross sectional view showing the state where the display panel casing in the second embodiment of the invention has been dropped into a connecting connector arranging concave portion of a control board of the main body casing.
Figure 6:
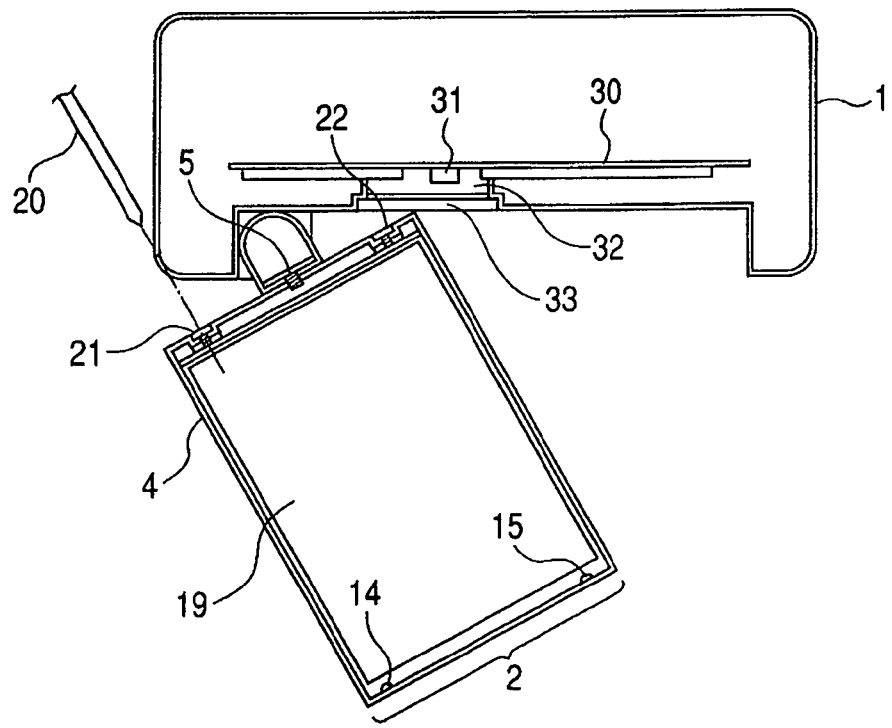
FIG. 6 is a cross sectional view showing the state where the connecting connector arranging concave portion of the control board of the main body casing has been closed by using a lid member when the image pickup apparatus in the second embodiment of the invention is used.

FIGS. 5 and 6 are diagrams showing the second embodiment of the invention. FIG. 5 is a cross sectional view showing the state where the display panel casing 2 according to the invention has been dropped into a connecting connector arranging concave portion of a control board of the main body casing 1. FIG. 6 is a cross sectional view showing the state where the connecting connector arranging concave portion of the control board of the main body casing 1 is covered with the lid when the image pickup apparatus is used.

In the diagrams, the same and similar component elements as those in the first embodiment are designated by the same reference numerals. Reference numeral 30 denotes a control circuit board for controlling the operation of the image pickup apparatus; 31 a connector provided on the control circuit board 30 in order to write data from the outside into a data-writable element on the control circuit board 30; 32 a concave portion of the main body casing 1 for enabling the connector 31 to be connected to the outside; and 33 a lid for closing the concave portion 32. The data writing operation through the connector 31 is executed only in the manufacturing step or when the image pickup apparatus is repaired. Therefore, since the lid 33 can be removed only at such specific timing, it has been fixed so that the general user cannot remove it.

In the above construction, in a manner similar to the case of the first embodiment, after the image pickup apparatus was completed at the factory, when the state of the display backlight driving circuit board 19 in the display panel casing 2 is checked at the final inspecting step, the display panel casing 2 is rotated in the opening direction from the state where the display panel casing 2 has been enclosed in the main body casing 1 in a manner similar to FIG. 4 shown in the first embodiment. When the surface of the main body casing 1 hidden by the display panel casing 2 appears, the lid 33 on the surface of the main body casing 1 is removed. Although details of an attaching method of the lid 33 are not shown in the embodiment, a method whereby the lid 33 is adhered with, for example, a double-sided adhesive tape or the like and fixed or the like may be used.

In the state where the lid 33 is removed and the concave portion 32 appears, the display panel casing 2 is opened by about 90° and, subsequently, rotated in the rotating direction by about 90°. In this state, when the display panel casing 2 is rotated in the closing direction toward the main body casing 1, the corner portion of the root side of the display panel casing 2 is dropped into the concave portion 32 of the main body casing 1.

The bit front edge of the screwdriver 20 is come into engagement with the engaging groove of the screw 21 from the front and the screw 21 is removed. After that, the display panel casing 2 is temporarily rotated in the opening direction, thereby obtaining the state where the corner portion of the root side of the display panel casing 2 has been pulled out of the concave portion 32. In this state, the display panel casing 2 is rotated by 180° and again rotated in the closing direction toward the main body casing 1. Thus, since the corner portion of the root side of the display panel casing 2 is dropped into the concave portion 32 of the main body casing 1, the other screw 22 on the root side of the display panel casing 2 can be removed.

In a manner similar to the case of the first embodiment, by removing the two screws 21 and 22 as mentioned above, the rear cover 4 is removed and the state of the display backlight driving circuit board 19 can be directly checked. Generally, since the lid 33 has been attached in the using state of the user, even if the user executes the operation as shown in the foregoing procedures, the display panel casing 2 is not dropped into the concave portion 32.

Third Embodiment

Figure 7:
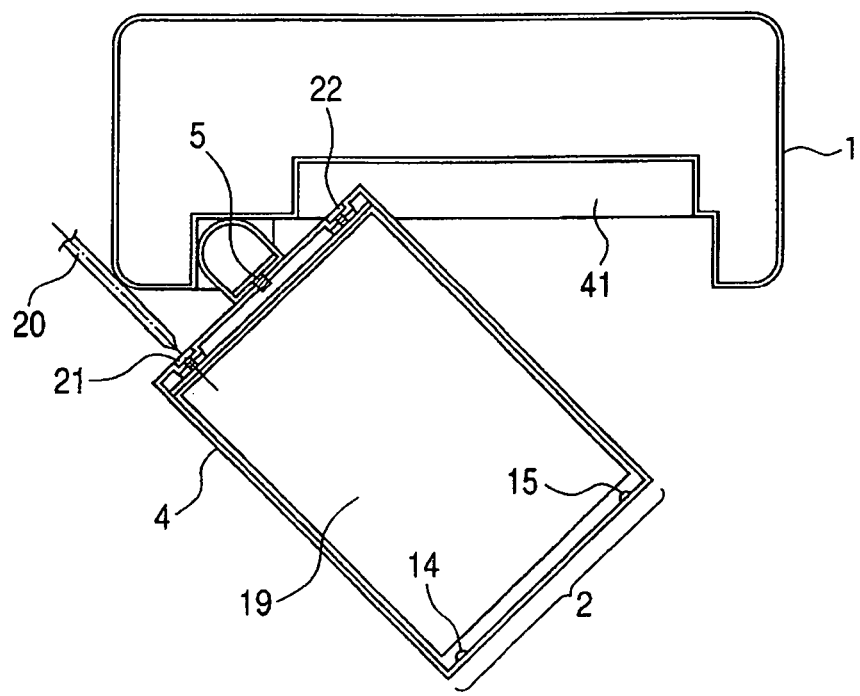
FIG. 7 is a cross sectional view showing the state where the display panel casing in the third embodiment of the invention has been dropped into a power source battery concave portion of the control board of the main body casing.
Figure 8:
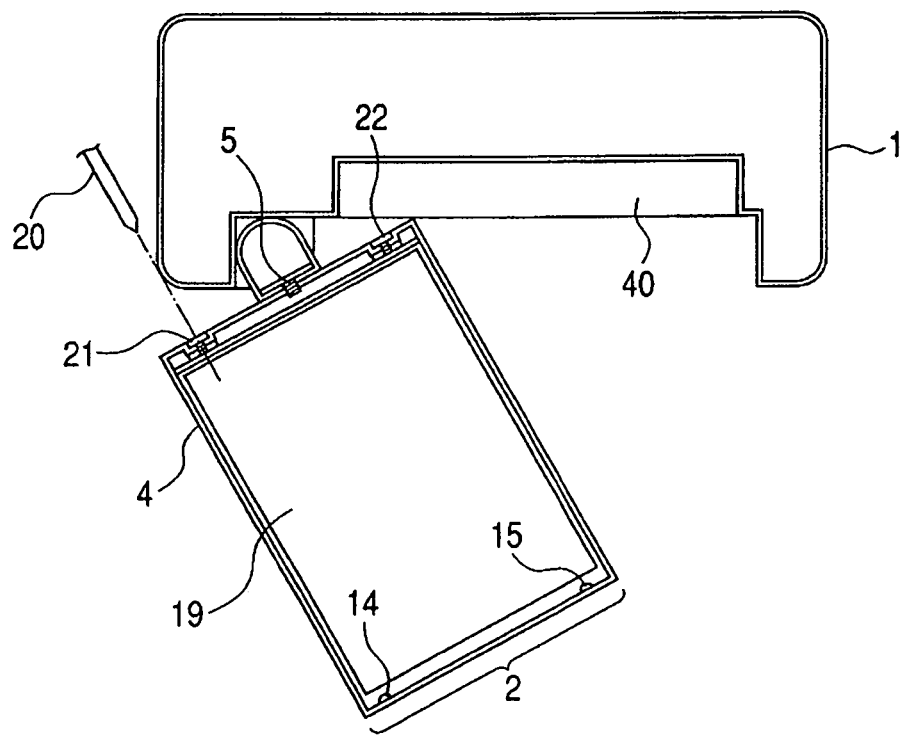
FIG. 8 is a cross sectional view showing the state where a power source battery has been inserted when the image pickup apparatus in the third embodiment of the invention is used.
Figure 9:
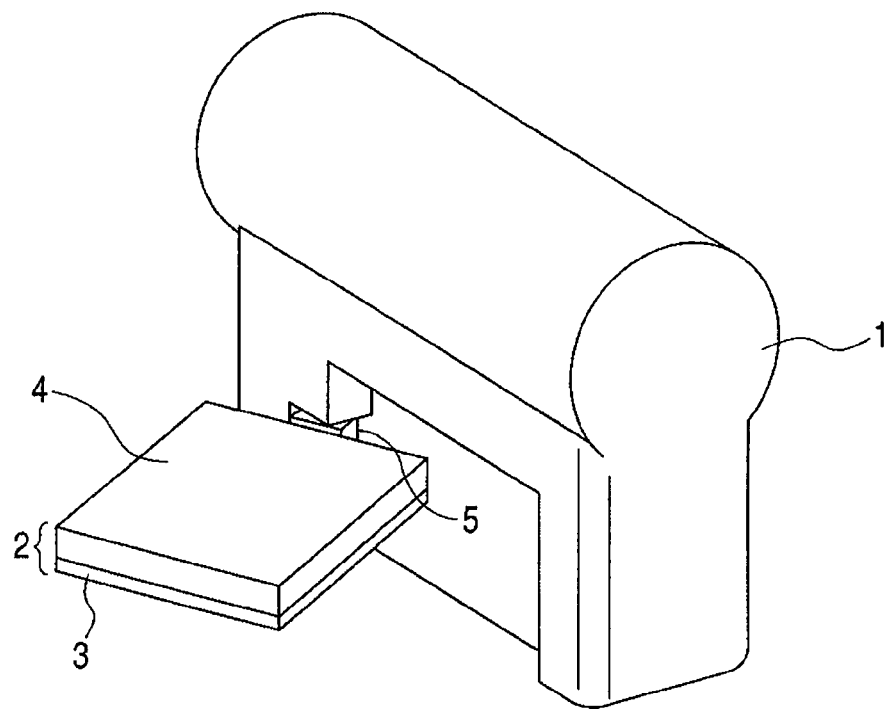
FIG. 9 is a perspective view showing a relation between the conventional display panel casing and a main body casing.
Figure 10:
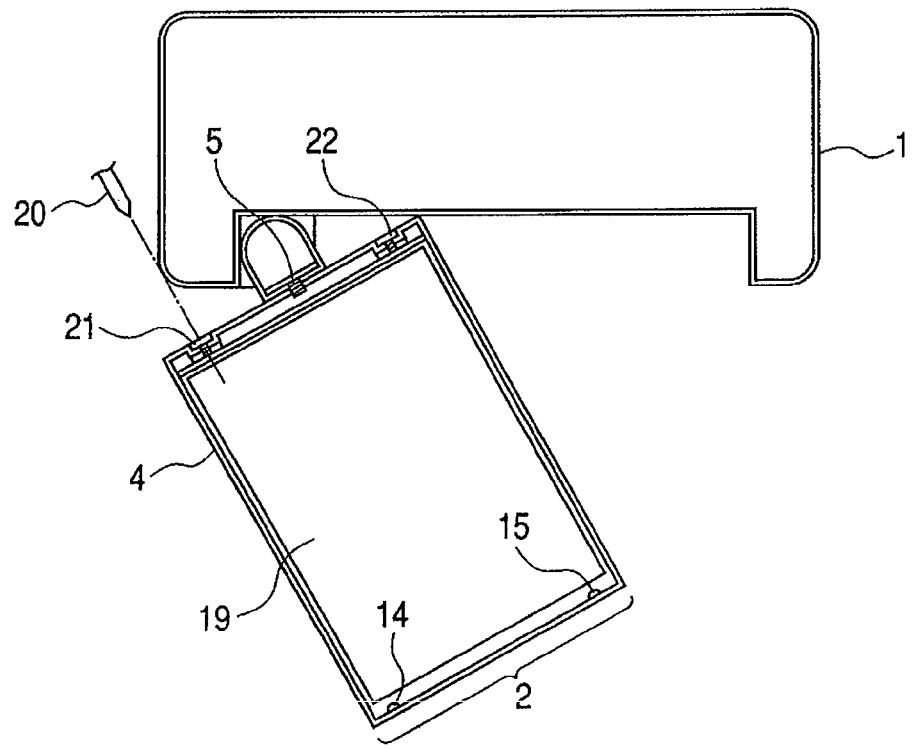
FIG. 10 is a schematic cross sectional view showing the relation between the conventional display panel casing and the main body casing.
Figure 11:
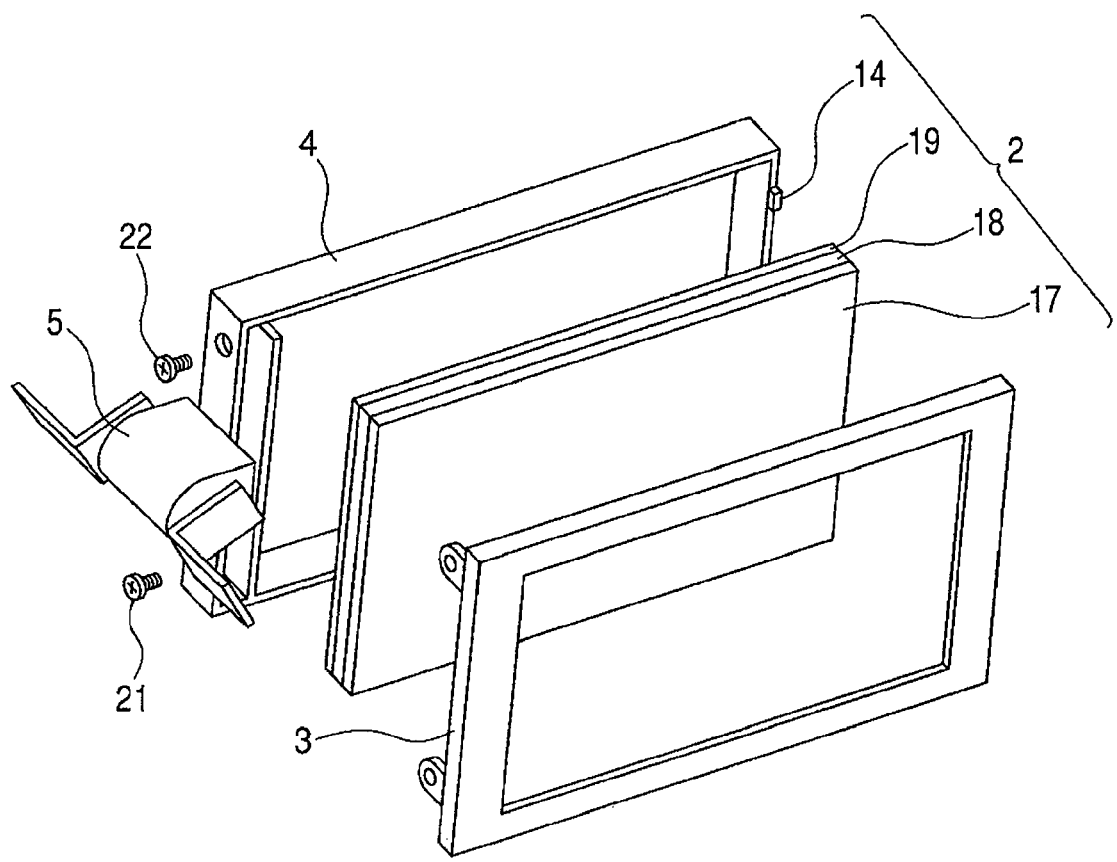
FIG. 11 is a development perspective view showing a construction of the conventional display panel casing.

FIGS. 7 and 8 are diagrams showing the third embodiment of the invention. FIG. 7 is a cross sectional view showing the state where the display panel casing 2 of the invention has been dropped into a power source battery attaching concave portion of the control board of the main body casing 1. FIG. 8 is a cross sectional view showing the state where a power source battery has been inserted when the image pickup apparatus is used.

In the diagrams, the same and similar component elements as those in the first embodiment are designated by the same reference numerals. Reference numeral 40 denotes a power source battery serving as an operating source of the image pickup apparatus and 41 indicates a concave portion of the main body casing 1 to which the power source battery 40 is attached.

In the above construction, in a manner similar to the cases of the first and second embodiments, after the image pickup apparatus was completed at the factory, when the state of the display backlight driving circuit board 19 in the display panel casing 2 is checked at the final inspecting step, the display panel casing 2 is rotated in the opening direction from the state where the display panel casing 2 has been enclosed in the main body casing 1 in a manner similar to FIG. 4 shown in the first embodiment. When the surface of the main body casing 1 hidden by the display panel casing 2 appears, the power source battery 40 on the surface of the main body casing 1 is removed. Although details of a removing method of the power source battery 40 are not shown in the embodiment, for example, a method whereby a fixing member to fix the power source battery 40 is provided and the fixing member is moved between a fixing position and a fixing cancelling position, thereby removing the power source 40, or the like may be used.

In the state where the power source battery 40 is removed and the concave portion 41 appears, the display panel casing 2 is opened by about 90° and, subsequently, rotated in the rotating direction by about 90°. In this state, when the display panel casing 2 is rotated in the closing direction toward the main body casing 1, the corner portion of the root side of the display panel casing 2 is dropped into the concave portion 41 of the main body casing 1. This state is shown in FIG. 7.

As shown in FIG. 7, the bit front edge of the screwdriver 20 is come into engagement with the engaging groove of the screw 21 from the front and the screw 21 is removed. After that, the display panel casing 2 is temporarily rotated in the opening direction, thereby obtaining the state where the corner portion of the root side of the display panel casing 2 has been pulled out of the concave portion 41. In this state, the display panel casing 2 is rotated by 180° and again rotated in the closing direction toward the main body casing 1. Thus, since the corner portion of the root side of the display panel casing 2 is dropped into the concave portion 41 of the main body casing 1, the other screw 22 on the root side of the display panel casing 2 can be removed.

Also in the third mentioned, in a manner similar to the cases of the first and second embodiments, by removing the two screws 21 and 22, the rear cover 4 is removed and the state of the display backlight driving circuit board 19 can be directly checked. Generally, since the power source battery 40 has been attached in the using state of the user, even if the user executes the operation as shown in the foregoing procedures, the display panel casing 2 is not dropped into the concave portion 41.

Although the embodiments of the invention have been described above, the invention is not limited only to the embodiments but many modifications and variations are possible within the scope of the invention.

For example, although the embodiments have been described above with respect to the example in which the concave portion is constructed as an enclosing portion of the functional member which is arranged in the apparatus main body, it is also possible to merely form only the concave portion by effectively using an empty space in the apparatus main body.

Although the embodiments have been described above with respect to the example of the image pickup apparatus, it is not always necessary to have the image pickup system so long as the display unit which is rotatable in the opening/closing direction and the rotating direction is provided. For example, the invention can be also applied to an electronic apparatus such as PDA, cellular phone, or the like which does not have the image pickup system.

This application claims priority from Japanese Patent Application No. 2005-156243 filed on May 27, 2005, which is hereby incorporated by reference herein.

What is claimed is:

1. An image pickup apparatus comprising:
   a display unit; and
   an apparatus main body having an enclosing portion which encloses the display unit, the enclosing portion having a concave portion in which a battery can be attached;
   wherein the display unit and the apparatus main body are rotatably connected to each other by a hinge, and the display unit has, on a hinge-side, a fastening member for fixing an exterior member of the display unit, and
   wherein the image pickup apparatus includes:
      a first state in which the battery is attached into the concave portion and a hinge-side corner portion of the display unit is not inserted into the concave portion when the display unit is rotated in a closing direction toward the apparatus main body, so that the fastening member cannot be operated from an outside; and
      a second state in which the battery is removed from the concave portion and the hinge-side corner portion of the display unit is inserted into the concave portion when the display unit is rotated in the closing direction toward the apparatus main body, so that the fastening member can be operated from the outside.

2. An image pickup apparatus according to claim 1, wherein the concave portion in which a battery can be attached is covered by a detachable lid member.

3. An image pickup apparatus comprising:
   a display unit; and
   an apparatus main body having an enclosing portion which encloses the display unit, a concave portion provided with a connector which connects with a circuit board in the enclosing portion, and a lid member which covers the concave portion, and;
   wherein the display unit and the apparatus main body are rotatably connected to each other by a hinge, and the display unit has, on a hinge-side, a fastening member for fixing an exterior member of the display unit, and
   wherein the image pickup apparatus includes:
      a first state in which the lid member covers the concave portion and a hinge-side corner portion of the display unit is not inserted into the concave portion when the display unit is rotated in a closing direction toward the apparatus main body, so that the fastening member cannot be operated from an outside; and
      a second state in which the lid member is removed from the concave portion and the hinge-side corner portion of the display unit is inserted into the concave portion when the display unit is rotated in the closing direction toward the apparatus main body, so that the fastening member can be operated from the outside.

* * * * *